United States Patent
Sananes et al.

(10) Patent No.: US 10,924,455 B2
(45) Date of Patent: Feb. 16, 2021

(54) METHOD AND SYSTEM FOR IMPLEMENTING A CLUSTER-WIDE COMMUNICATION OVER A SINGLE PORT

(71) Applicant: Dell Products L.P., Round Rock, TX (US)

(72) Inventors: Yaron Sananes, Tel Aviv (IL); Alexey Ilyevsky, Zur Izhak (IL)

(73) Assignee: Dell Products L.P., Round Rock, TX (US)

( * ) Notice: Subject to any disclaimer, the term of this patent is extended or adjusted under 35 U.S.C. 154(b) by 236 days.

(21) Appl. No.: 15/466,563

(22) Filed: Mar. 22, 2017

(65) Prior Publication Data

US 2018/0278579 A1 Sep. 27, 2018

(51) Int. Cl.
| | |
|---|---|
| *H04L 29/06* | (2006.01) |
| *H04L 29/08* | (2006.01) |
| *G06F 16/178* | (2019.01) |
| *G06F 16/182* | (2019.01) |
| *G06F 11/00* | (2006.01) |

(52) U.S. Cl.
CPC .............. *H04L 63/02* (2013.01); *G06F 11/00* (2013.01); *G06F 16/178* (2019.01); *G06F 16/182* (2019.01); *H04L 63/029* (2013.01); *H04L 67/1095* (2013.01)

(58) Field of Classification Search
CPC ... H04L 29/06; H04L 67/1095; H04L 63/029; G06F 16/182; G06F 16/178; G06F 11/00
See application file for complete search history.

(56) References Cited

U.S. PATENT DOCUMENTS

| | | | | |
|---|---|---|---|---|
| 6,643,795 | B1 * | 11/2003 | Sicola ................. | G06F 11/2069 714/11 |
| 6,728,885 | B1 * | 4/2004 | Taylor ................. | H04L 63/0263 709/238 |
| 6,880,052 | B2 * | 4/2005 | Lubbers .............. | G06F 11/2058 711/114 |
| 2003/0155128 | A1 * | 8/2003 | Gay ...................... | E21B 43/128 166/369 |

(Continued)

OTHER PUBLICATIONS

"Features and Benefits of HSG80 ACS 8.6P Data Replication Manager", Oct. 2001, Compaq Computer Corporation, Enterprise Storage Group, pp. 1-22 (Year: 2001).*

*Primary Examiner* — Tongoc Tran
(74) *Attorney, Agent, or Firm* — Pearl Cohen Zedek Latzer Baratz LLP

(57) ABSTRACT

A method and a system for implanting a handshake between a source cluster having files replicated to a destination cluster, the system comprising: a source cluster having a plurality of nodes and replication manager; and a destination cluster having a plurality of nodes, a replication manager and single port manager which run on each node of the destination cluster, wherein the replication managers of the source and destination clusters are configured to replicate all files and processes on the nodes of the source cluster to the nodes of the destination cluster, wherein all replicated files and processes register with the single port manager, and wherein the single port manager is configured to communicate with the source cluster via a single port and to provide descriptors of the required replicated files and processes via a kernel.

18 Claims, 2 Drawing Sheets

(56) References Cited

U.S. PATENT DOCUMENTS

| | | | | |
|---|---|---|---|---|
| 2003/0187945 A1* | 10/2003 | Lubbers | ................ | G06F 11/201 709/213 |
| 2003/0187947 A1* | 10/2003 | Lubbers | .............. | G06F 11/2058 709/217 |
| 2003/0188035 A1* | 10/2003 | Lubbers | .............. | G06F 11/1666 719/310 |
| 2003/0188114 A1* | 10/2003 | Lubbers | .............. | G06F 11/2058 711/162 |
| 2003/0188119 A1* | 10/2003 | Lubbers | ................... | G06F 9/50 711/170 |
| 2007/0022122 A1* | 1/2007 | Bahar | ................... | G06F 9/5011 |
| 2013/0077621 A1* | 3/2013 | Jacob Da Silva | ...... | H04L 45/58 370/355 |
| 2014/0029627 A1* | 1/2014 | Kumar | ................... | H04L 47/22 370/419 |
| 2015/0052220 A1* | 2/2015 | Melvin | ................... | H04L 67/06 709/217 |
| 2015/0269183 A1* | 9/2015 | Avati | ................... | G06F 16/1844 707/634 |
| 2015/0301278 A1* | 10/2015 | Rosenow | .......... | C03B 37/01211 385/123 |
| 2018/0107679 A1* | 4/2018 | Arneja | ................... | G06F 16/178 |

\* cited by examiner

METHOD AND SYSTEM FOR IMPLEMENTING A CLUSTER-WIDE COMMUNICATION OVER A SINGLE PORT

FIELD OF THE INVENTION

The present invention relates generally to the field of storage devices, and more particularly to clustered file systems.

BACKGROUND OF THE INVENTION

Prior to the background of the invention being set forth, it may be helpful to provide definitions of certain terms that will be used hereinafter.

The term "file" as used herein refers to a container for storing data in a file system.

The term "directory" as used herein refers to a cataloging structure which contains references to other files, and possibly other directories. The term "file" includes the term "directory".

The term "volume" or "logical drive" refers herein to a single accessible storage area with a single file system, In a distributed file system, files of a same volume need not necessarily stored on the same physical storage device (e.g., hard disk). From a client perspective, however, files of the same volume are subject to the same rules and logic. It is the file system task to handle the management of the files on the volume in a manner that is transparent to the client of the file system.

The term "clustered file system" or "node cluster" refers herein to a file system which is shared by being simultaneously mounted on multiple servers. There are several approaches to clustering, most of which do not employ a clustered file system (only direct attached storage for each node). Clustered file systems can provide features like location-independent addressing and redundancy which improve reliability or reduce the complexity of the other parts of the cluster. Parallel file systems are a type of clustered file system that spread data across multiple storage nodes, usually for redundancy or performance.

The term "replication" refers herein to sharing information so as to ensure consistency between redundant resources, such as storage devices, to improve reliability, fault-tolerance, or accessibility. Active (real-time) storage replication is usually implemented by distributing updates of a block device to several physical hard disks. This way, any part of a distributed file system supported by the operating system can be replicated without modification, as the file system code works on a level above the block device driver layer. It is implemented either in hardware (in a disk array controller) or in software (in a device driver).

Replicating data between two clusters of a file system involves several process: Replication managers which responsible to send the control data (managing); File system domains which responsible to send the replicated data according to the command/control data that the replication manager instruct.

When replicating a source node cluster to a destination node cluster, the number of nodes at the destination cluster is not necessarily the same as the number of nodes at the source cluster.

This asymmetry may cause some of the filesystem domains (FSD) to be allocated to other nodes on the destination cluster than their allocation at the source cluster. FSDs are running on all nodes, but each FSD is running on a single node (FSD0 run on node0 for example).

Additionally, since each cluster has a process called replication manager (RM) which manages the replication process, the asymmetry between the clusters does not guarantee that the RM will be allocated at the destination cluster in the same node as in the source cluster. Replication managers are running on a single node (only one of the nodes in the cluster).

The communication between the clusters is carried out using the client IP (VIP) which can assign the connection to any node in the cluster. Because of that, the connection may not be reached to the desired destination service. For example: in the destination, the RM is running on node1, but the VIP assigned the communication to node0. In the destination, the FSD0 is located in node0, but the VIP assigned to node1.

It could be even more problematic in case of node failover, in which case, FSD0 can be located on node1, and the RM can be located on any node.

The number of nodes can be unequal, so in case of 4 nodes cluster in the source can replicate data to the destination with 2 nodes system only. In that case, FSD which runs on node 2 or 3 should be mapped to the relevant FSD which will accept to handle his request only on node0/1.

In order to accomplish a successful replication of the clusters, the relocation manager at the source cluster needs to know, via the replication manager at the destination cluster, at which destination nodes all replicated filesystem domains were allocated.

Since several processes are being used during replication, each of the processes requires an open port to listen on (on the destination system). In order to achieve that, the administrator needs to open each port on the firewall.

A problem may arise if the communication between clusters is carried out via a firewall where only one port is opened for communication. The motivation for using only a single port is due to security reasons. In a single port, a replication manager at the source cluster might miss out on the replication manager at the destination cluster, and as a result the replication process cannot be carried out.

It should be noted that having to comply with a firewall requirement while accommodating several open port requires the administrator permission and slows down any procedure. The present invention eliminates the need to get the administrator permission as only one port (that is already being managed under the firewall) is used.

SUMMARY OF THE INVENTION

In order for the aforementioned problem to be addressed, it is suggested to provide, in accordance with some embodiments of the present invention, on the destination cluster, a process called "single port manager" (SPM) which will run on each node of the destination cluster. The SPM will be running on each node. The SPM is listening on the single port defined for the replication communication.

Then, in accordance with some embodiments of the present invention, each of the processes (e.g., FSD, RM) register to the SPM (e.g., using Linux domain socket). By virtue of this registration, each process tells to the SPM its identifier (FSD0, 1, 2, 3, etc.). Whenever a packet arrives to the SPM, the SPM checks as part of the handshake what is the desired process and redirects the communication to the relevant node.

In accordance with some embodiments of the present invention, a system for implanting a handshake between a source node cluster having file domains and a destination node cluster to which said filed domains are replicated is provided herein. The system may include: a source node cluster having a plurality of nodes and a replication manager; and a destination node cluster having a plurality of nodes, a replication manager and a single port manager for each node of the destination node cluster, wherein each of the single port managers is configured to inform the replication manager at the source node cluster of the node at the destination cluster node where the replication manager of the destination node cluster is located, via a single port opened in a firewall monitoring communication going between the source node cluster and the destination node cluster, wherein the replication managers of the source and destination node clusters are configured to replicate all files and processes on the nodes of the source node cluster to the nodes of the destination node cluster via said single port, wherein all replicated file domains register with the single port manager of the node on which they are replicated, wherein the single port manager is configured to communicate with the source node cluster via said single port to provide descriptors of replicated file domains, in response to inquiries from the source node cluster.

In accordance with some embodiments of the present invention, the system may further include a cluster-wide distributed database configured to store the file domain descriptors obtained by each of the single port managers, wherein each of the single port managers is configured to obtain the file domain descriptors of all replicated file domains.

In accordance with some embodiments of the present invention, the registration of the file domains register with the single port manager is carried out via a kernel of the respective node.

In accordance with some embodiments of the present invention, the source node cluster and a destination node cluster have a different number of nodes.

In accordance with some embodiments of the present invention, the source node cluster and a destination node cluster each are part of two distinct file systems.

In accordance with some embodiments of the present invention, the source node cluster and a destination node cluster each are part of a same distributed file system.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
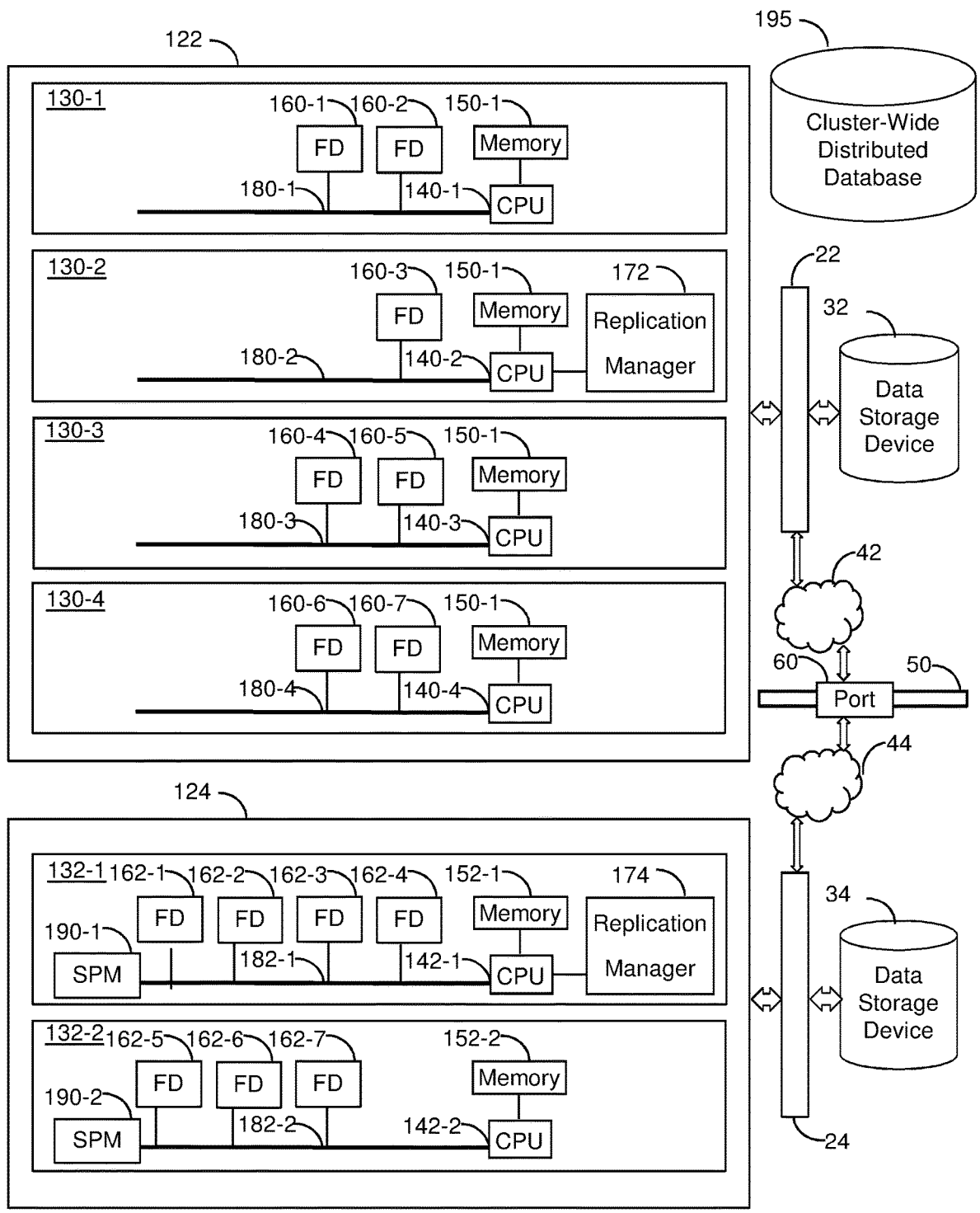
FIG. 1 is a block diagram illustrating non-limiting exemplary architecture of a file system in accordance with some embodiments of the present invention.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

A possible flow for implementing the required aforementioned handshake process, in accordance with some embodiments of the present invention, between the source and destination cluster post replication is as follows: in a case that the handshake packet arrives to the wrong node, the SPM sends back a redirect packet which contains the physical node IP of the correct node (not a virtual IP but the real node IP). When the source cluster receives the redirect packet, it will reconnect to the destination cluster but now with the node IP which guarantees reaching the desired (correct) node.

Once the relevant node is reached, the SPM sends the file descriptor of the communication to the relevant process (FSD or RM). Sending the file descriptor guarantees high performance with minimum latency (no coping of the data as Proxy usually does).

Since the registration information is stored on the distributed DB (CDB) of each, the SPM on each node, knows where all other services are running so in the phase of the handshake the communication can be redirected to the relevant node.

The aforementioned flow enables supporting smooth communication between two clusters with a different number of nodes+support failover (while service moving to other nodes)+minimum latency with copy less architecture (no copying the data as Proxy) and all that while communication over virtual IP and over single port opened on the firewall.

Additionally, in accordance with some embodiments of the present invention, the solution also supports secure (SSL-based encryption) as well as non-secure communication.

FIG. 1 is a block diagram illustrating a non-limiting exemplary and simplified architecture of system 100 in accordance with some embodiments of the present invention. System 100 includes a source node cluster 122 having all its file domains (160-1 to 160-7) replicated to a destination node cluster 124 wherein the replication is carried out via a single port 60 in a firewall 50 that is connecting networks 42 and 44 and destination node cluster 124 to source node cluster 122.

Specifically, and as a non-limiting example, source node cluster 122 may include four nodes 130-1 to 130-4 and a destination node cluster 124 having two node 132-1 and 132-2. Each of nodes 130-1 to 130-4 and 132-1 to 132-2 includes a respective memory 150-1 to 150-4 and 152-1 to 150-2 on which instructions are stored and a respective computer processing unit (CPU) 140-1 to 140-4 and 142-1 to 142-2 on which the various processes of the file system run. In addition to various processes (not shown here) that help manage the file system, each of nodes 130-1 to 130-4 may have one or more file domains such as 160-1 to 160-7 in communication on the node level via respective kernels 180-1 to 180-4. Additionally, a process called replication manager 172 is located on one of the nodes 130-2 of source node cluster 122, and a respective replication manager 174 is located on one of the nodes 132-1 of destination node cluster 124, both both replication managers 172 and 174 are configured to manage together the replication procedure of all file domains 160-1 to 160-7 to destination node cluster 124.

Each of node clusters 122 and 124 is connected possibly via a dedicated bus 22 or 24 to a respective data storage device 32 or 34 where the data of the file domains is physically stored.

In accordance with some embodiments of the present invention, each of nodes 131-1 to 132-2 of destination node cluster 124 has a respective process called single port manager (SPM) 190-1 and 190-2.

In operation, and in accordance with some embodiments of the present invention, replication manager 172 of source cluster 122 communicates via single port 60 which is opened in firewall 50 after it receives the node ID where replication manager 174 of destination node cluster 124 is located (node 132-1). This may be achieved either directly from single port manager 190-1 on node 132-1 in case replication manager 172 of source cluster 122 approached node 132-1 initially or via a cluster-wide distributed database 195 in case node 132-2 was approached by replication manager 172 of source cluster 122.

According to some embodiments of the present invention, the single port manager 190-1 and 190-2 then receives a request from replication manager 172 of source cluster 122. In case the respective destination node (e.g., 132-1 for 190-1 and 132-2 for 190-2) does not contain replication manager 174 (e.g., in the example described herein, node 132-2 does not have a replication manager), single port manager 190-2 looks at cluster-wide distributed database 195 and responds with the ID of the node 132-1 at destination node cluster 124 where the replication manager 174 is located.

According to some embodiments of the present invention, and in order to facilitate this process, each of destination file domains 162-1 to 162-7 and destination replication manager 174 first registers with its respective single port manager 190-1 or 190-2 upon replication, and then relevant single port manager 190-1 or 190-2 is configured to transfer files descriptor of where the destination file domains 162-1 to 162-7 and destination replication manager 174 are actually located via respective kernel 182-1 and 182-2 so there is practically no latency involved.

Figure 2:
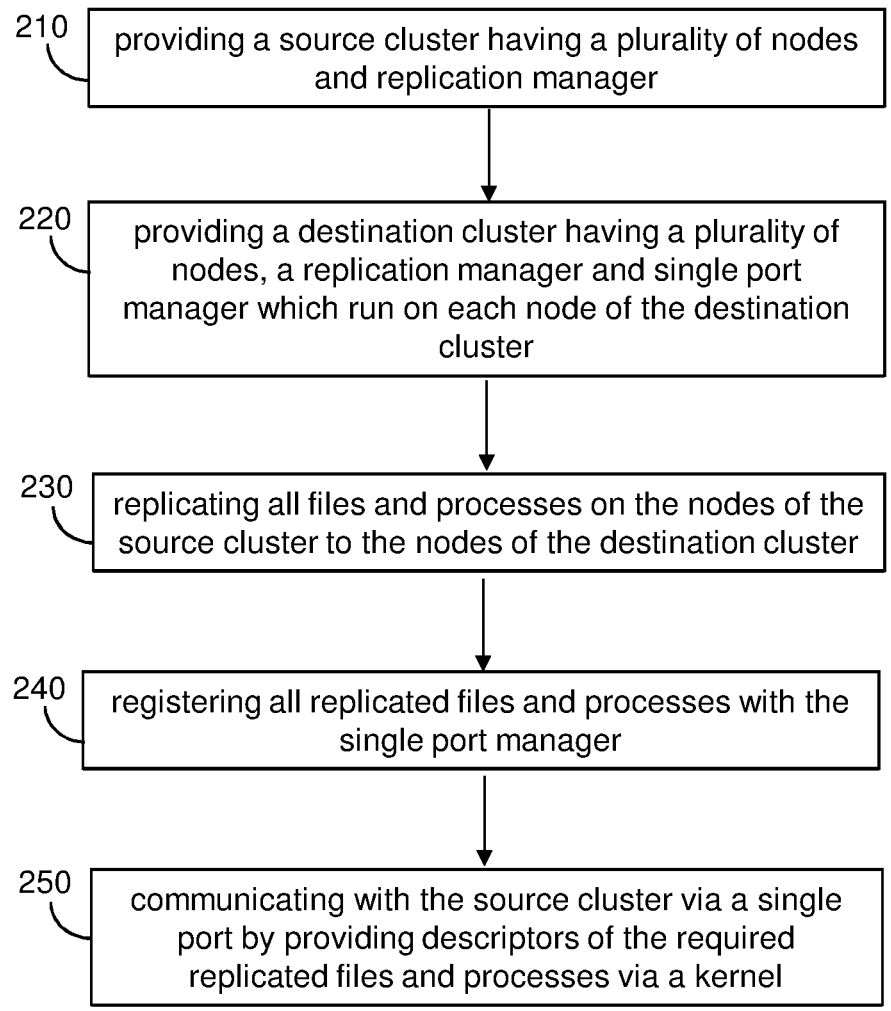
FIG. 2 is a high level flowchart illustrating a method in accordance with some embodiments of the present invention.

FIG. 2 is a high level flowchart illustrating non-limiting exemplary method in accordance with some embodiments of the present invention. Method 200 may include the following steps: providing a source cluster having a plurality of nodes and replication manager 210; providing a destination cluster having a plurality of nodes, a replication manager and single port manager which run on each node of the destination cluster 220; replicating all files and processes on the nodes of the source cluster to the nodes of the destination cluster 230; registering all replicated files and processes with the single port manager 240, and communicating with the source cluster via a single port and to provide descriptors of the required replicated files and processes via a kernel 250.

In accordance with some embodiments of the present invention method 200 may be implemented by a non-transitory computer readable medium that includes a set of instructions that, when executed, cause the least one computer processor to: provide a source cluster having a plurality of nodes and replication manager; provide a destination cluster having a plurality of nodes, a replication manager and single port manager which run on each node of the destination cluster; replicate all files and processes on the nodes of the source cluster to the nodes of the destination cluster; register all replicated files and processes with the single port manager; and communicate with the source cluster via a single port and provide descriptors of the required replicated files and processes via a kernel.

In order to implement the method according to some embodiments of the present invention, a computer processor may receive instructions and data from a read-only memory or a random access memory or both. At least one of aforementioned steps is performed by at least one processor associated with a computer. The essential elements of a computer are a processor for executing instructions and one or more memories for storing instructions and data. Generally, a computer will also include, or be operatively coupled to communicate with, one or more mass storage devices for storing data files. Storage modules suitable for tangibly embodying computer program instructions and data include all forms of non-volatile memory, including by way of example semiconductor memory devices, such as EPROM, EEPROM, and flash memory based solid state disks (SSDs) and also magneto-optic storage devices.

As will be appreciated by one skilled in the art, aspects of the present invention may be embodied as a system, method or computer program product. Accordingly, some aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in base band or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Some aspects of the present invention are described above with reference to flowchart illustrations and/or portion diagrams of methods, apparatus (systems) and computer program products according to some embodiments of the invention. It will be understood that each portion of the flowchart illustrations and/or portion diagrams, and combinations of portions in the flowchart illustrations and/or portion diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or portion diagram portion or portions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or portion diagram portion or portions.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or portion diagram portion or portions.

The aforementioned flowchart and diagrams illustrate the architecture, functionality, and operation of possible implementations of systems, methods and computer program products according to various embodiments of the present invention. In this regard, each portion in the flowchart or portion diagrams may represent a module, segment, or portion of code, which comprises one or more executable instructions for implementing the specified logical function(s). It should also be noted that, in some alternative implementations, the functions noted in the portion may occur out of the order noted in the figures. For example, two portions shown in succession may, in fact, be executed substantially concurrently, or the portions may sometimes be executed in the reverse order, depending upon the functionality involved. It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only. The principles and uses of the teachings of the present invention may be better understood with reference to the accompanying description, figures and examples.

It is to be understood that the details set forth herein do not construe a limitation to an application of the invention. Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers. If the specification or claims refer to "an additional" element, that does not preclude there being more than one of the additional element. It is to be understood that, where the claims or specification refer to "a" or "an" element, such reference is not be construed that there is only one of that element. It is to be understood that where the specification states that a component, feature, structure, or characteristic "may", "might", "can" or "could" be included, that particular component, feature, structure, or characteristic is not required to be included. Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described. Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs. The descriptions, examples, methods and materials presented in the claims and the specification are not to be construed as limiting but rather as illustrative only. Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein. Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A system for implementing a handshake between a source node cluster having file domains and a destination node cluster to which said file domains are replicated, the system comprising:
   a source node cluster having a plurality of nodes and a replication manager; and
   a destination node cluster having a plurality of nodes, a replication manager and a single port manager for each node of the destination node cluster, wherein a number of the nodes at the destination node cluster and the number of nodes at the source node cluster is unequal,
   wherein each of the single port managers is configured to inform the replication manager at the source node cluster of the node at the destination cluster node where the replication manager of the destination node cluster is located, via a single port opened in a firewall monitoring communication going between the source node cluster and the destination node cluster, wherein said single port is an only port that is opened for communication via said firewall between said source node cluster and said destination node cluster,
   wherein the replication managers of the source and destination node clusters are configured to replicate all files and processes on the nodes of the source node cluster to the nodes of the destination node cluster via said single port,
   wherein all replicated file domains register with the single port manager of the node on which they are replicated, and
   wherein the single port manager is configured to communicate with the source node cluster via said single port to provide descriptors of replicated file domains, in response to inquiries from the source node cluster.

2. The system according to claim 1, further comprising a cluster-wide distributed database configured to store the file domain descriptors obtained by each of the single port managers, wherein each of the single port managers is configured to obtain the file domain descriptors of all replicated file domains.

3. The system according to claim 1, wherein the registration of said file domains register with said single port manager is carried out via a kernel of the respective node.

4. The system according to claim 1, wherein the source node cluster and a destination node cluster have a different number of nodes.

5. The system according to claim 1, wherein the source node cluster and a destination node cluster each are part of two distinct file systems.

6. The system according to claim 1, wherein the source node cluster and a destination node cluster each are part of a same distributed file system.

7. A method for implementing a handshake between a source node cluster having file domains and a destination node cluster to which said file domains are replicated, the method comprising:
   providing a source node cluster having a plurality of nodes and a replication manager;
   providing a destination node cluster having a plurality of nodes, a replication manager and a single port manager for each node of the destination node cluster, wherein a number of the nodes at the destination node cluster and the number of nodes at the source node cluster is unequal;
   informing the replication manager at the source node cluster of the node at the destination cluster node where the replication manager of the destination node cluster is located, via a single port opened in a firewall monitoring communication going between the source node cluster and the destination node cluster, wherein said single port is an only port that is opened for communication via said firewall between said source node cluster and said destination node cluster;
   replicating all files and processes on the nodes of the source node cluster to the nodes of the destination node cluster via said single port;
   registering all of the replicated file domains with the single port manager of the node on which they are replicated; and
   communicating with the source node cluster via said single port to provide descriptors of replicated file domains, in response to inquiries from the source node cluster.

8. The method according to claim 7, further comprising storing the file domain descriptors obtained by each of the single port managers, wherein each of the single port managers is configured to obtain the file domain descriptors of all replicated file domains.

9. The method according to claim 7, wherein the registration of said file domains register with said single port manager is carried out via a kernel of the respective node.

10. The method according to claim 7, wherein the source node cluster and a destination node cluster have a different number of nodes.

11. The method according to claim 7, wherein the source node cluster and a destination node cluster each are part of two distinct file systems.

12. The method according to claim 7, wherein the source node cluster and a destination node cluster each are part of a same distributed file system.

13. A non-transitory computer readable medium that includes a set of instructions, that when executed, cause the least one computer processor to:

manage a source node cluster having a plurality of nodes and a replication manager;

manage a destination node cluster having a plurality of nodes, a replication manager and a single port manager for each node of the destination node cluster, wherein a number of the nodes at the destination node cluster and the number of nodes at the source node cluster is unequal;

inform the replication manager at the source node cluster of the node at the destination cluster node where the replication manager of the destination node cluster is located, via a single port opened in a firewall monitoring communication going between the source node cluster and the destination node cluster, wherein said single port is an only port that is opened for communication via said firewall between said source node cluster and said destination node cluster;

replicate all files and processes on the nodes of the source node cluster to the nodes of the destination node cluster via said single port;

registering all of the replicated file domains with the single port manager of the node on which they are replicated; and communicate with the source node cluster via said single port to provide descriptors of replicated file domains, in response to inquiries from the source node cluster.

14. The non-transitory computer readable medium according to claim 13, further comprising a set of instructions, that when executed, cause the least one computer processor to store the file domain descriptors obtained by each of the single port managers, wherein each of the single port managers is configured to obtain the file domain descriptors of all replicated file domains.

15. The non-transitory computer readable medium according to claim 13, wherein the registration of said file domains register with said single port manager is carried out via a kernel of the respective node.

16. The non-transitory computer readable medium according to claim 13, wherein the source node cluster and a destination node cluster have a different number of nodes.

17. The non-transitory computer readable medium according to claim 13, wherein the source node cluster and a destination node cluster each are part of two distinct file systems.

18. The non-transitory computer readable medium according to claim 13, wherein the source node cluster and a destination node cluster each are part of a same distributed file system.

* * * * *